Dec. 3, 1935.  W. A. SCHULZ  2,023,103
MOTION PICTURE APPARATUS
Filed Dec. 19, 1930
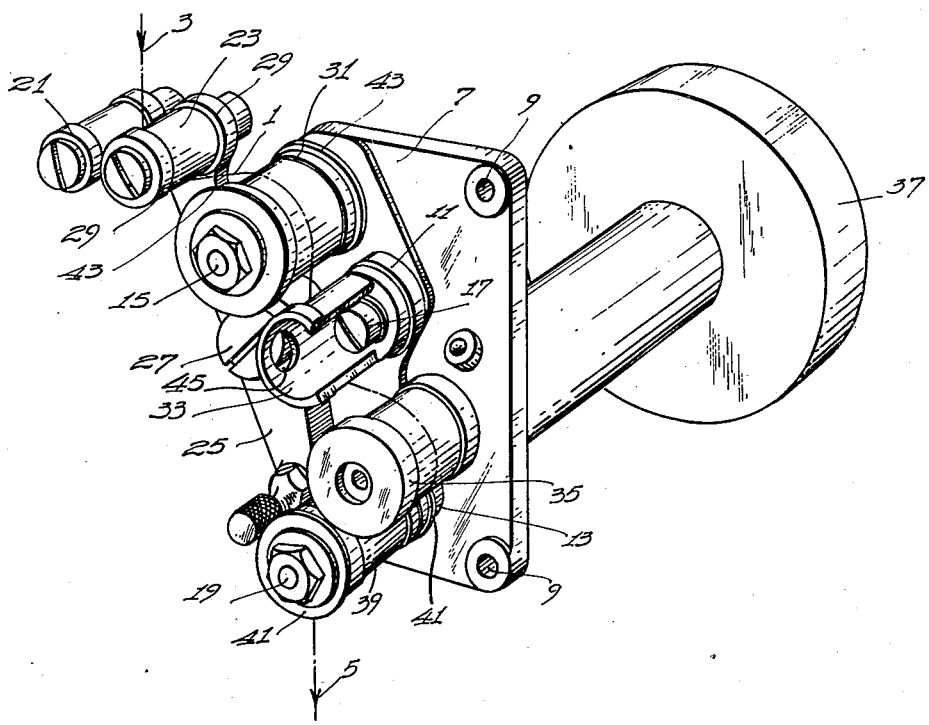
WITNESSES.
INVENTOR
Walter A. Schulz.
BY
ATTORNEY Patented Dec. 3, 1935

2,023,103

UNITED STATES PATENT OFFICE 2,023,103

MOTION PICTURE APPARATUS

Walter A. Schulz, Oaklyn, N. J., assignor to Westinghouse Electric & Manufacturing Company, a corporation of Pennsylvania Application December 19, 1930, Serial No. 503,447

4 Claims. (Cl. 271—2.3)

My invention relates to motion-picture apparatus and has particular relation to film gates.

Film gates, constructed according to the teachings of the prior art, with which I am familiar, ordinarily comprise an aperture-plate over which the film passes and through the aperature of which a light beam is projected when the film is reproduced. The film is ordinarily tensioned by the action of a plurality of pressure shoes disposed on a support commonly known as a shoe plate.

In film gates of a second type, not so widely used as those of the type mentioned above, the film is tensioned by being passed between two pressure rollers before it passes over the aperture-plate.

With the development of photo-acoustic recording and reproduction, certain problems were injected into the field of web-operating machines which did not previously exist. One of the primary requirements of satisfactory photo-acoustic recording and reproduction is that the film shall move smoothly and uniformly past the opening in the aperture-plate. Unless uniformity in speed is attained, disagreeable distortion, commonly known as "chattering", is introduced into the reproduction.

Considerable experimental work has been done to adapt the film gates, constructed as taught by the prior art, to the photo-acoustic field, but little success has attended this work. The film moves at a comparatively uneven rate through most gates of the shoe type, and gates of the pressure-roller type react even more unsatisfactorily in this connection. In general, my experimental work has taught me that, for photo-acoustic reproduction, it is highly desirable that the external forces to which the film is subjected shall be as small as possible.

Moreover, in photo-acoustic apparatus, it is essential that the film be protected from the deleterious effects of frictional members. In spite of precautions taken to prevent the shoes from coming into contact with sections of the film on which the sound or the picture is impressed, I have found that the records and the picture are considerably marred after passing through these tensioning devices.

It is, accordingly, an object of my invention to provide a film gate particularly adapted for the smooth and uniform transition of a film.

Another object of my invention is to provide a film gate wherein the film is tensioned without the aid of pressure shoes.

A further object of my invention is to provide a film gate wherein the external forces affecting the film are a minimum.

An ancillary object of my invention is to provide a film gate particularly adapted to be utilized in photo-acoustic and reproducing machines.

Another ancillary object of my invention is is to provide a film gate wherein the film comes under the action of a minimum sliding frictional force.

More concisely stated, it is an object of my invention to utilize a property, other than the coefficient of friction of the film, in tensioning it as it passes over an aperture-plate.

According to my invention, I provide a film gate wherein the necessary tensioning is produced, to a limited extent, by the dynamic friction existing between a plurality of rollers, over which the film passes, and their bearings, chiefly by the flexing of the film. The rollers are comparatively light in design and it is, as a matter of fact, desirable that the frictional effect be held to a minimum. On the other hand, by reason of its stiffness, the film offers a certain resistance to flexing and, consequently, if it is sufficiently flexed, enough energy is utilized in flexing it to cause it to be tensioned as it is advanced.

In the present application, the film is flexed by being passed over a plurality of staggered rollers disposed adjacent to the aperture-plate. It is conceivable that these rollers may be replaced by skids, similar to the aperture-plate, but, according to my experiment, the former are considerably more satisfactory. As a matter of fact, I have found that, for the most satisfactory operation, the region over which the film engages a fixed surface should be reduced to a minimum.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which the single figure is a view, in perspective, of a film gate constructed according to my invention.

For purposes of clarity, the film has not been illustrated in the drawing, but its center is represented by a broken line 1, and its direction of travel is indicated by a plurality of arrows 3 and 5.

The apparatus illustrated in the drawing comprises a base plate 7 equipped with a plurality of mounting holes 9 and having a plurality of bosses 11 and 13 cast integral therewith, whereon a plurality of studs 15, 17 and 19, for supporting the necessary film-operating mechanisms, are supported.

In traversing the particular gate illustrated, the film passes between two rollers 21 and 23 which are separated by a distance greater than the thickness of the film and are rotatably supported on a bracket 25 pivoted upon a stud 27 secured to the main base 7.

During the threading operation, the bracket 25 is moved in such direction that the rollers 21 and 23 are separated from the remainder of the apparatus, as is illustrated in the drawing. By this process, the threading is considerably facilitated.

Since I have found it desirable to eliminate sliding friction between the machine parts and the film, I have equipped the roller 23, over which the film has the greatest angle of contact, with a plurality of rubber or felt tires 29, and have thus increased the frictional torque exerted by the film. In this manner, the tendency of the film to slide over the roller 23 has been substantially eliminated.

The remaining roller 21, mounted on the pivoted bracket, serves only the purpose of preventing the film from becoming disengaged from the tire roller 23. The roller 21 is, therefore, not provided with means for diminishing the tendency of the film to slide over its surface.

After passing between the rollers 21 and 23 on the pivoted bracket 25, the film is flexed and passes over a roller 31 rotatably secured on the stud 15, fastened in the supporting base 7 of the system. The film then passes over the aperture-plate 33, engages a roller 35 having a comparatively heavy fly-wheel 37 mounted on its shaft, and passes over another roller 39 equipped with flanges 41, whereby it is laterally guided in its passage. The length and shape of bracket 25 are such that it does not project into contact with the film at or near roller 39.

The film is advanced over the rollers 35 and 39 and over the aperture-plate 33 by a sprocket (not shown). As has been explained hereinabove, the film is held under tension by reason of its resistance to flexing as it passes over the rollers 23 and 31 above the aperture-plate.

It is to be noted that the roller 31, directly above the aperture-plate 33, is equipped with flanges 43. The flanges 43 are simply utilized in aiding to guide the film laterally. It is furthermore well to point out that, in accordance with my discovery, the film should be under the action of as little sliding friction as possible, I have made the aperture-plate 33 of comparatively small radius of curvature. The film thus engages the plate over a comparatively small region, and its motion is not perceptibly distorted by the uncertain frictional forces existing between it and the plate. The aperture 45, through which the sound-exciting radiations, in the present case, are transmitted, is located substantially at the center of the plate 33 and is of large enough area to completely take in the sound track, in spite of any weaving motion on the part of the film, and to provide for the necessary focussing operations.

It is well to point out that, although, in the present embodiment of my invention, the film is flexed by being passed over only two rollers 23 and 31, it is within the scope of my invention to provide for flexing of the film by passing it over any number of rollers. The number of rollers that it is desirable to utilize, of course, depends on the particular structure of the machine and on the relation of the gate to the other elements of the apparatus utilized in the machine.

The illustrated embodiment of my invention is an attachment that is ordinarily affixed to a motion-picture machine, thus rendering it capable of reproducing a sound motion picture. In such a connection, the number and the disposition of the rollers is apparently a function of the machine for which the unit is intended as an attachment.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. In film-handling apparatus a member to support a film for impressing a record or a picture thereon or for reproducing a record or a picture impressed thereon, the region of engagement of said member and said film being small, a roller disposed adjacent to said member from the surface of which said film is to be advanced onto said member, and at least another roller disposed adjacent to said first-named roller from the surface of which said film is to be advanced onto the surface of said first-named roller, said rollers being so disposed relative to each other that the curve formed by the strip of film extending between the surfaces thereof has two stationary points and a point of inflection therebetween and the only forces exerted on the strip of said film between the point where it just passes onto said last-named roller to the point where it passes from said member being small forces of friction exerted by said rollers and said member.

2. In film-handling apparatus a member to support a film for impressing a record or a picture thereon or for reproducing a record or a picture impressed thereon, the region of engagement of said member and said film being small, a surface disposed adjacent to said member from which said film is to be advanced onto said member, and at least another surface disposed adjacent to said first-named surface of which said film is to be advanced onto said first-named surface, said surfaces being so disposed relative to each other that the curve formed by the strip of film extending between them has two stationary points and a point of inflection therebetween and the only forces exerted on the strip of said film between the point where it just passes onto said last-named surface to the point where it passes from said member being small forces of friction exerted by said surfaces and said member.

3. In film-handling apparatus a member to support a film for impressing a record or a picture thereon or for reproducing a record or a picture impressed thereon, the region of engagement of said member and said film being small, a roller disposed adjacent to said member from the surface of which said film is to be advanced onto said member, and a roller equipped with tires to be engaged by the film, said tires being of a material with respect to which said film has a high coefficient of friction, disposed adjacent to said first-named roller from the surface of which said film is to be advanced onto the surface of said first-named roller, said rollers being so disposed relative to each other that the curve formed by the strip of film extending between the surfaces thereof has two stationary points and a point of inflection therebetween and the only forces exerted on the strip of said film between the point where it just passes onto said last-named roller to the point where it passes from said member being small forces of friction exerted by said rollers and said member.

4. In film-handling apparatus a member to support a film for impressing a record or a picture thereon or for reproducing a record or a picture impressed thereon, the region of engagement of said member and said film being small, a roller disposed adjacent to said member from the surface of which said film is to be advanced onto said member, at least another roller disposed adjacent to said first-named roller from the surface of which said film is to be advanced onto the surface of said first-named roller, said rollers being so disposed relative to each other that the curve formed by the strip of film extending between the surfaces thereof has two stationary points and a point of inflection therebetween, and still another roller mounted to be moved from a point comparatively remote from said second-named roller to a point comparatively near but out of contact therewith for guiding said film on said second-named roller, the only forces exerted on the strip of said film between the point where it just passes onto said second-named roller to the point where it passes from said member being small forces of friction exerted by said rollers and said member.

WALTER A. SCHULZ.